(12) United States Patent
Toukura et al.

(10) Patent No.: US 6,269,289 B1
(45) Date of Patent: Jul. 31, 2001

(54) PROCESS OF FORMING STANDARD RESISTANCE VALUES AND VEHICLE CONTROL USING SAME

(75) Inventors: Nobusuke Toukura, Kanagawa; Hiroaki Nishijima; Masayuki Yasuoka, both of Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/513,459

(22) Filed: Mar. 3, 2000

(30) Foreign Application Priority Data

Mar. 5, 1999 (JP) .................................................. 11-058291

(51) Int. Cl.$^7$ .................................................. G01P 15/00
(52) U.S. Cl. .................................. 701/1; 701/70; 73/146
(58) Field of Search .................................. 701/1, 54, 70, 701/95, 65, 101; 73/146

(56) References Cited

U.S. PATENT DOCUMENTS

| | | | |
|---|---|---|---|
| 4,833,612 | * 5/1989 | Okuno et al. | 364/426.04 |
| 5,465,208 | * 11/1995 | Mochizuki et al. | 364/426.01 |
| 5,496,227 | * 3/1996 | Minowa et al. | 477/62 |
| 5,507,705 | 4/1996 | Hara | 477/408 |
| 5,527,232 | 6/1996 | Seidel et al. | 477/46 |
| 5,612,873 | * 3/1997 | Ogawa | 364/424 |
| 5,728,026 | 3/1998 | Sakaguchi et al. | 479/110 |
| 5,806,009 | 9/1998 | Horiguchi | 701/58 |
| 5,925,087 | * 7/1999 | Ohinishi et al. | 701/70 |
| 5,931,380 | * 8/1999 | Aoki et al. | 237/12.3 |
| 6,006,144 | * 12/1999 | Takahashi et al. | 701/1 |
| 6,060,983 | * 5/2000 | Yanase et al. | 340/442 |
| 6,076,032 | * 6/2000 | Kuroda et al. | 701/54 |

FOREIGN PATENT DOCUMENTS 9-242862  9/1997 (JP) .
12-27980  1/2000 (JP) .

OTHER PUBLICATIONS

"Automotive Engineering", published Jun. 1996 by Tetsudo Nippon Kaisha, (month not available).

* cited by examiner

Primary Examiner—Tan Nguyen
Assistant Examiner—Dalena Tran
(74) Attorney, Agent, or Firm—Foley & Lardner

(57) ABSTRACT

A process of forming a value of standard resistance for an automotive vehicle and a vehicle control system are disclosed. The process comprises sensing operating parameters indicative of operating conditions of the vehicle power train during operating an engine to keep the automotive vehicle rolling over the surface of a flat road in steady running state at each of said predetermined number of reading points of vehicle speed, A value of driving torque produced by the power train is derived from the sensed operating parameters at each of the predetermined number of reading points of vehicle speed. Finally, the derived values of driving torque are set as known standard resistance values at the predetermined number of reading points of vehicle speed, respectively.

14 Claims, 10 Drawing Sheets

MEASUREMENT OF STANDARD
RESISTANCE AT READING POINTS

PROCESS OF FORMING STANDARD RESISTANCE VALUES AND VEHICLE CONTROL USING SAME

FIELD OF THE INVENTION

The present invention relates to a process of forming standard resistance values for an automotive vehicle, and a vehicle control system for an automotive vehicle.

BACKGROUND OF THE INVENTION

The term "standard resistance" or "standard running resistance" is herein used to mean any force which opposes the motion of an automotive vehicle which is driven to keep rolling over the surface of a flat road having 0% gradient at a constant vehicle speed. The term "running resistance" is herein used to mean any force which opposes the motion of an automotive vehicle which is driven to keep rolling over the surface of a road at a constant vehicle speed. Running resistance is equal to standard resistance if an automotive vehicle is driven to keep rolling over the surface of a flat road having 0% gradient at a constant vehicle speed. Running resistance increases and becomes greater than standard resistance if the automotive vehicle is accelerated to increase speed from the constant vehicle speed. The term "acceleration resistance" is herein used to mean this increment or difference in running resistance that has occurred due to acceleration. Running resistance is greater when the automotive vehicle is driven to keep rolling over the surface of a flat road having gradient greater than 0% at a constant vehicle speed than standard resistance for the same vehicle speed. The term "gradient resistance" is used to mean this increment or difference in running resistance.

JP-A 9-242862 discloses a vehicle control system in which a speed ratio between an input shaft and an output shaft of an automatic transmission is controlled in response to road gradient, throttle opening degree, and vehicle speed. In order to estimate road gradient of a road, over which the vehicle is rolling, a road gradient torque (T$\alpha$) is determined by subtracting from a driving torque (To) a sum of a flat road running resistance torque (Tr) and an acceleration resistance torque (T$\alpha$). A characteristic of variation of flat road running resistance torque (Tr) against variation of vehicle speed is mapped. This mapped data are retrieved using a current reading point of vehicle speed to give a value of flat road running resistance torque (Tr).

An assignee to which the present invention is to be assigned filed as an applicant Japanese Patent Application No. 10-199894 in Japan on Jul. 15, 1998. This Japanese Patent Application does not form prior art under 35 U.S.C. 102 and 35 U.S.C. 103, and it does not form the state of the art under Article 54(2) EPC.

Japanese Patent Application No. 10-199894 discloses a vehicle control system for an automotive vehicle including an internal combustion engine and a continuously variable transmission (CVT). The control system determines an ordinary input shaft speed against operator manipulation of an accelerator pedal and vehicle speed. The ordinary input shaft speed is an input shaft speed of the CVT against the current operator manipulation of accelerator and vehicle speed for supporting the motion of the automotive vehicle, which is rolling over a flat road having 0% gradient at the current vehicle speed. The control system determines a gradient resistance (force) and sets a portion, less than 100%, of the determined gradient resistance force as a driving force correction. The control system corrects the determined ordinary input shaft speed by an amount corresponding to the driving force correction.

The vehicle control systems mentioned above are satisfactory to some extent. Need remains to further develop the vehicle control systems by enhancing accuracy with which standard resistance (a flat road resistance torque, for example) is approximated.

Standard resistance may be approximated using the magnitude of deceleration during the inertia motion of an automotive vehicle that is rolling over a flat road having 0% gradient. This approximation technique is known as "coast down technique." Alternatively, the standard resistance may be determined as a quadratic function of vehicle speed during the inertia motion of an automotive vehicle that is rolling over a flat road.

Driving an automotive vehicle to keep rolling over a flat road having 0% gradient, there occurs resistance due to frictional loss in power train and in accessory drive. If values of standard resistance approximated using the coast down technique have been stored, a microcomputer-based controller may attribute the above-mentioned resistance due to the frictional loss to road gradient irrespective of the fact that the automotive vehicle is rolling over a flat road. This might cause the controller to increase driving force irrespective of the fact there is no road gradient, degrading a drive feel during driving an automotive vehicle over a flat road.

FIG. 11 is a schematic view of a conventional CVT of the V-belt type. The CVT comprises a primary pulley 30, a secondary pulley 36, and a V-belt 35 interconnecting the pulleys 30 and 36, Each of the pulleys 30 and 36 grips the V-belt 35 for transmission of power. The pulleys 30 and 36 have displaceable pulley halves 31 and 37 and servo chambers 34 and 39, respectively. The pulley haves 31 and 37 are forced into frictional engagement with the V-belt 35 in response to levels of hydraulic pressure PR and PL fed to the servo chambers 34 and 39. The levels of hydraulic pressure PR and PL are determined by operating conditions, which are defined by a shift range position, operator manipulation of accelerator pedal, and vehicle speed.

According to the coast down technique, a neutral (N) range is selected to accomplish the inertia motion of an automotive vehicle that is rolling over a flat road having 0% gradient. In the N range, the levels of hydraulic pressure PR and PL within the servo chambers 34 and 39 drop to the lowest.

The vehicle operator depresses the accelerator pedal to drive the automotive vehicle to keep rolling over the flat road at a constant vehicle speed. Under this condition, the levels of hydraulic pressure PR and PL within the servo chambers 34 and 39 are always greater than the lowest level.

The displaceable pulley halves and stationary pulley halves, which are biased into frictional engagement the V-belt 35, are slightly deformed due to increased friction force and hydraulic pressure PR and PL so that the centerline of the V-belt 35 deviates by $\Delta\theta$. This deviation $\Delta\theta$ causes an increase in friction.

Friction force caused by engagement of the pulleys with the V-belt and friction due to the deviation $\Delta\theta$ may cause a microcomputer-based controller to attribute this friction to road gradient if standard resistance determined by coast down technique is used. The controller may increase driving force in response to the increased friction than expected by the vehicle operator, In an automatic transmission of the gearing type, levels of hydraulic pressure developed within each of torque transmitting friction units for drive (D) range are higher than those for neutral (N) range. Thus, there is an increase in running resistance during driving with D range over the surface of a flat road. This increase in running resistance is caused by a pumping loss to accomplish an increase in hydraulic pressure from the level for the N range to the level for the D range and by friction of rotary elements that are engaged.

An object of the present invention is to provide a process of forming, with good accuracy, a characteristic on which a value of standard resistance of an automotive vehicle lies.

Another object of the present invention to provide a vehicle control system for an automotive vehicle, which is free from any variation in driving force unexpected by an operator.

SUMMARY OF THE INVENTION

According to one aspect of the present invention, there is provided a process of forming a value of standard resistance for an automotive vehicle, the automotive vehicle having driving wheels, each having a tire, and a power train including an engine, the process comprising:

operating the engine to keep the automotive vehicle rolling over the surface of a flat road having 0% gradient in steady running state at each of a predetermined number of reading points of vehicle speed;

sensing operating parameters indicative of operating conditions of the power train during operating the engine to keep the automotive vehicle rolling over the surface of the flat road in steady running state at each of said predetermined number of reading points of vehicle speed;

deriving a value of driving torque produced by the power train from said sensed operating parameters at each of said predetermined number of reading points of vehicle speed; and setting said derived values of driving torque as known standard resistance values at said predetermined number of reading points of vehicle speed, respectively.

According to a second aspect of the present invention, there is provided a process of forming a value of standard resistance for an automotive vehicle, the automotive vehicle having driving wheels, each having a tire, and a power train including an engine, the process comprising:

sensing speed of wind flowing against the automotive vehicle;

operating the engine to keep the automotive vehicle rolling over the surface of a flat road having 0% gradient in steady running state at a given vehicle speed against wind at each of a predetermined number of reading points of wind speed;

sensing operating parameters indicative of operating conditions of the power train during operating the engine to keep the automotive vehicle rolling over the surface of the flat road in steady running state at said given vehicle speed against wind at each of said predetermined number of reading points of wind speed;

deriving a value of driving torque produced by the power train from said sensed operating parameters at each of said predetermined number of reading points of wind speed; and setting said derived values of driving torque as known standard resistance values at said predetermined number of reading points of wind speed, respectively.

According to a third aspect of the present invention, there is provided a process of forming a value of standard resistance for an automotive vehicle, the automotive vehicle having driving wheels, each having a tire, and a power train including an engine, the process comprising:

determining air pressure of the tires of the driving wheels;

operating the engine to keep the automotive vehicle rolling over the surface of a flat road having 0% gradient in steady running state at a given vehicle speed at each of a predetermined number of reading points of the tire air pressure;

sensing operating parameters indicative of operating conditions of the power train during operating the engine to keep the automotive vehicle rolling over the surface of the flat road in steady running state at said given vehicle speed at each of said predetermined number of reading points of the tire air pressure;

deriving a value of driving torque produced by the power train from said sensed operating parameters at each of said predetermined number of reading points of the tire air pressure; and setting said derived values of driving torque as known standard resistance values at said predetermined number of reading points of the tire air pressure, respectively.

According to a fourth aspect of the present invention, there is provided a process of forming a value of standard resistance for an automotive vehicle, the automotive vehicle having driving wheels, each having a tire, and a power train including an engine, the process comprising:

determining external temperature around the automotive vehicle;

operating the engine to keep the automotive vehicle rolling over the surface of a flat road having 0% gradient in steady running state at a given vehicle speed at each of a predetermined number of reading points of the external temperature;

sensing operating parameters indicative of operating conditions of the power train during operating the engine to keep the automotive vehicle rolling over the surface of the flat road in steady running state at said given vehicle speed at each of said predetermined number of reading points of the external temperature;

deriving a value of driving torque produced by the power train from said sensed operating parameters at each of said predetermined number of reading points of the external temperature; and setting said derived values of driving torque as known standard resistance values at said predetermined number of reading points of the external temperature, respectively.

According to a fifth aspect of the present invention, there is provided a A vehicle control system for an automotive vehicle having driving wheels, each having a tire, and a power train including an engine and an automatic transmission, comprising:

a first arithmetic system that inputs a plurality of operating parameters of the power train and outputs a first signal only;

a second arithmetic system that inputs a parameter indicative of state in which the automotive vehicle runs and outputs a second signal only; and a control system that outputs a command on the power train in such a manner as to decrease an error between said first and second signals toward zero, wherein said second arithmetic system contains a predetermined characteristic of variation said second signal against variation of said indicative parameter, wherein, at each of a predetermined number of reading points of said state indicative parameter, a value of said second signal is determined when said error is kept at the minimum;

wherein said determined values of said second signal are set as known values at said predetermined number of reading points of said state indicative parameter, respectively.

DESCRIPTION OF THE PREFERRED EMBODIMENTS

Figure 1:
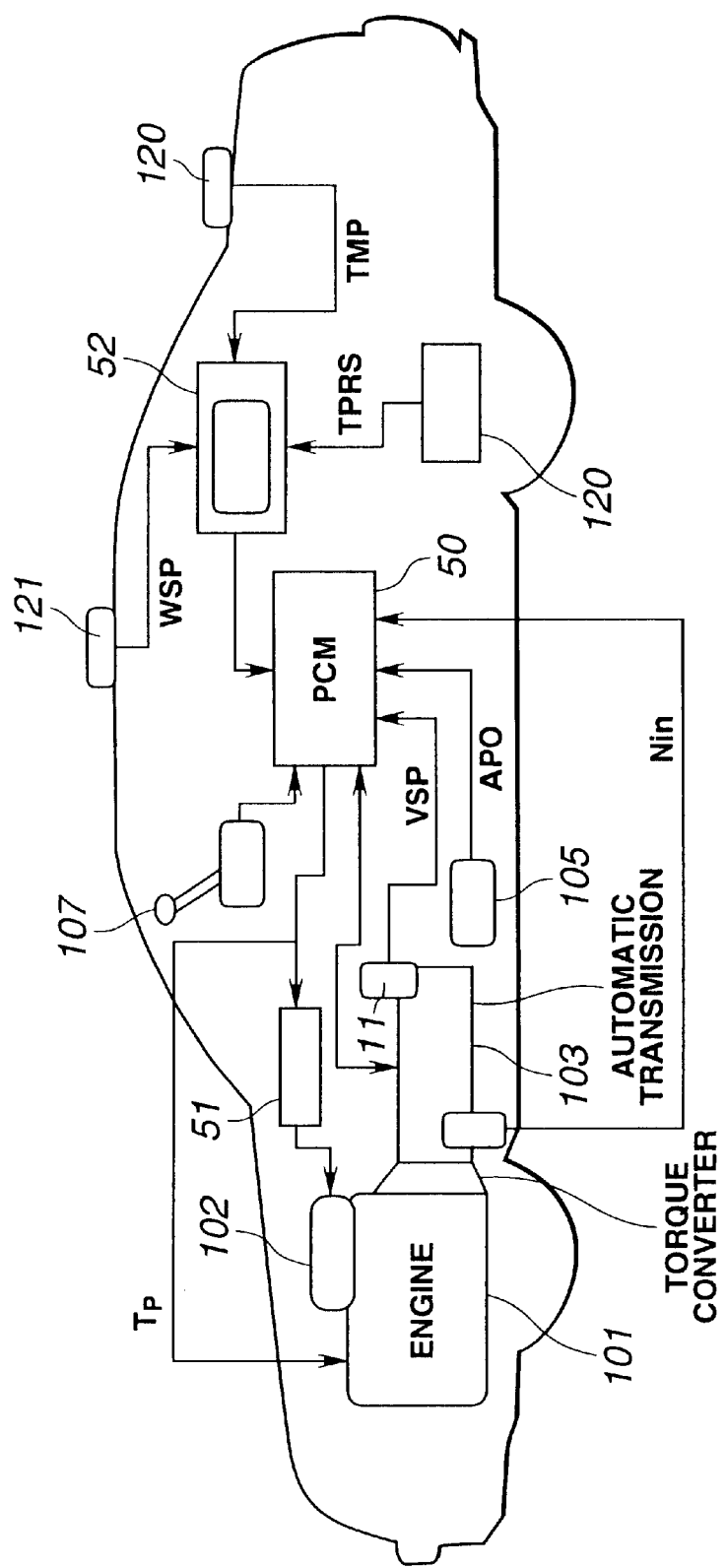
FIG. 1 is a block diagram of an automotive vehicle having driving wheels, a power train including an engine and an automatic transmission, and a power train control module (PCM).

FIG. 1 illustrates an automotive vehicle installed with a power train control module (PCM) 50. The vehicle has a power train, which includes an internal combustion engine 101, an automatic transmission 103, and a torque converter situated between the engine 101 and the transmission 103. The PCM 50 can control output torque of the engine 101 and a speed ratio between an input shaft and an output shaft of the automatic transmission 103.

The automotive vehicle is equipped with an accelerator, in the form of a gas pedal, which opens in degrees. The vehicle operator manipulates the accelerator to express operator power demand. A so-called accelerator pedal opening (APO) sensor 105 detects the operator manipulation of the accelerator. In particular, the APO sensor 105 detects accelerator pedal opening APO of the accelerator and generates, as an output signal, an APO signal indicative of the detected APO. The automatic transmission 103 has selectable ranges including a drive (D) range, a park (P) range and a reverse (R) range and a range select lever 107. The operator can select one of the selectable ranges by manipulating the range select lever 107. An inhibitor switch generates, as an output signal, a current range selected by the range select lever 107. A vehicle speed sensor 11 detects revolution speed of the transmission output shaft and generates, as an output signal, a vehicle speed signal indicative of vehicle speed VSP of the automotive vehicle. A crankshaft angle sensor generates crankshaft angle signals that are indicative of engine speed, ie., the number of revolution per minute (NRPM). The APO signal, select signal, VSP signal, and crankshaft angle signals are fed to the PCM 50. The PCM 50 controls driving torque imparted to drive axles. The driving torque may be altered by controlling one of or any combination of the engine fuel injection quantity Tp, the engine intake airflow rate Qa, and the engine ignition timing IG and also by controlling speed ratio and/or hydraulic pressure within the automatic transmission 103.

An electronically controlled throttle valve 102, which includes an actuator, is disposed in an intake passage of the engine 101 to control intake airflow rate Qa. In response to a throttle valve opening (TVO) command from the PCM 50, a throttle control module (TCM) 51 activates the actuator to adjust position of the throttle valve 102.

The automatic transmission 103 is in the form of a continuously variable transmission (CVT) whose speed ratio can be adjusted in response to a ratio command from the PCM 50. The PCM 50 calculates a product of VSP and a predetermined coefficient to give the result as the CVT output shaft speed No. An input shaft speed sensor 12 detects revolution speed of the CVT input shaft and generates, as an output signal, a CVT input shaft speed signal indicative of the detected CVT input shaft speed Nin. The PCM 50 calculates a ratio No/Nin to give the result as a speed ratio RATIO. The PCM 50 determines a target speed ratio tRATIO and produces a ratio command indicative of the determined target speed ratio tRATIO. In response to the ratio command, a ratio control mechanism of the CVT 103 is controlled to adjust the RATIO toward the tRATIO.

Figure 11:
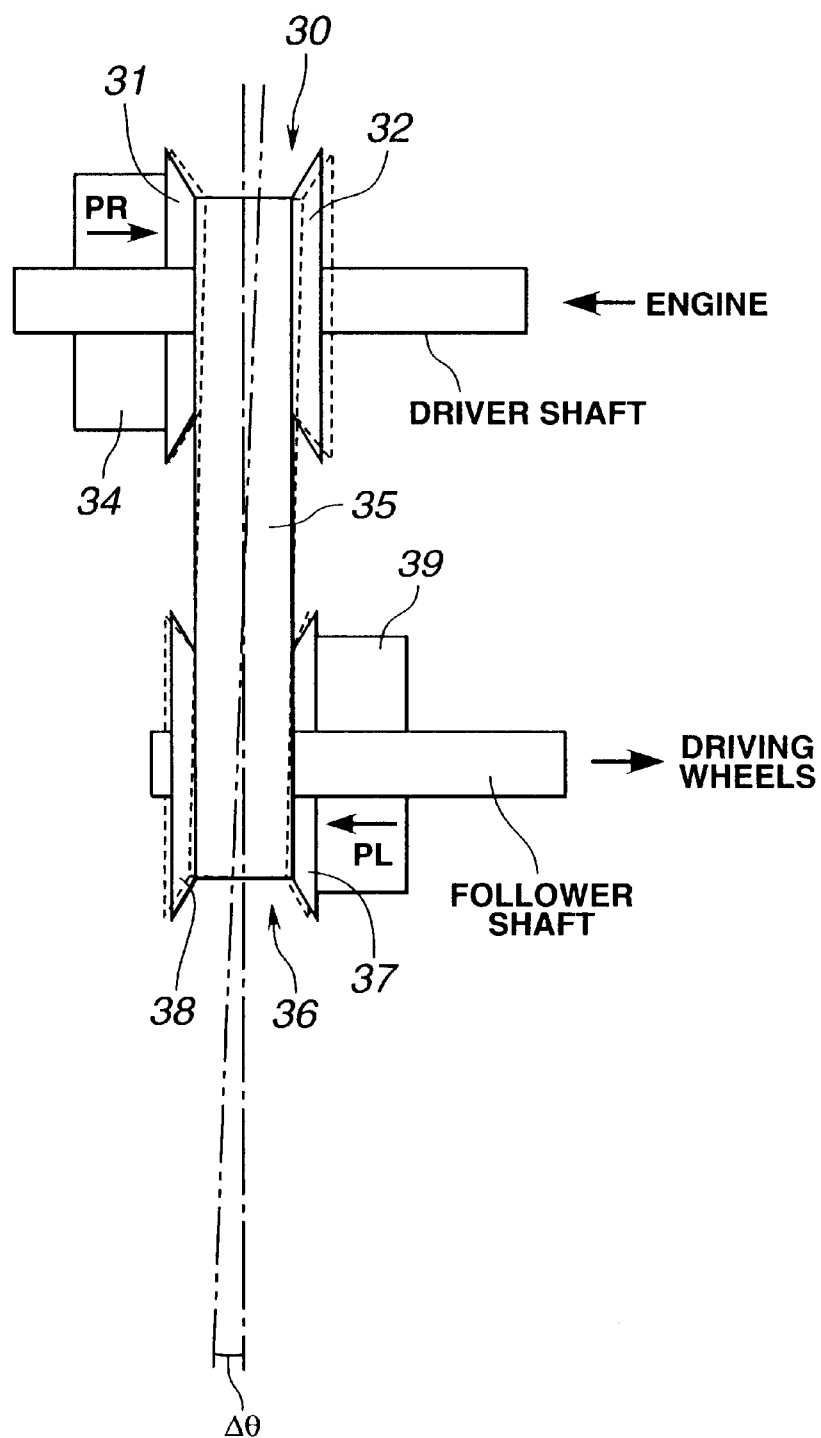
FIG. 11 is a schematic view of a CVT of the V-belt type illustrating a difference between operation with no load and operation with torque transmission.

The automatic transmission 103 may take the form of a CVT of the V-belt type as shown in FIG. 11.

To obtain the ambient environment, the automotive vehicle has an external temperature sensor 120, an anemometer 121, and a tire pressure detector 130. The external temperature sensor 120 measures the external temperature TMP of the vehicle. The anemometer 121 is arranged to measure wind speed WSP in a direction of travel of the vehicle. The pressure detector 130 measures tire air pressure TPRS of at least one of tires of driving wheels. The measured TMP, WSP and TPRS are transmitted to an external environment information-processing module (EEIPM) 52.

The anemometer 121 may take the form of a pitot-tube anemometer. Pages 42 and 43 of a book "Automotive Engineering" published June 1996 by Tetsudo Nippon Kaisha disclose a tire pressure detector wherein tire pressure is determined by estimation based on wheel speed of each wheel. This tire pressure detector may be used as the tire pressure detector 130. Another alternative may be a tire pressure detector wherein detection of air pressure within a tire is carried out using a magnet fixed to the tire and a Hall-effect unit fixed to a vehicle body.

The EEIPM 52 sends TMP, WSP and TPRS to the PCM 50.

Figure 2:
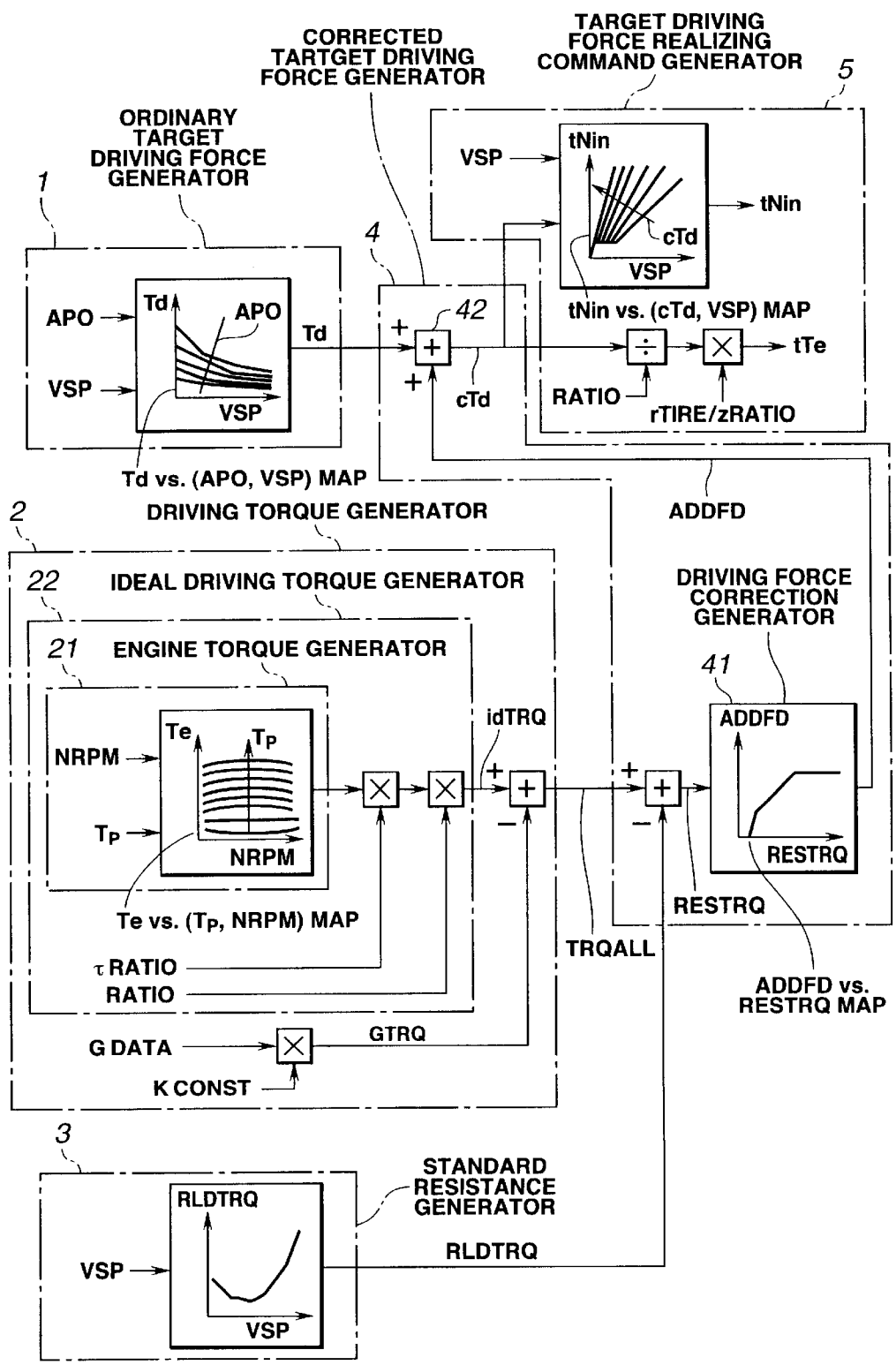
FIG. 2 is a control diagram implementing the present invention.

FIG. 2 illustrates the preferred implementation of the present invention. Referring to FIG. 2, the reference numeral 1 designates an ordinary target driving force generator (OTDFG). The APO and VSP are used as inputs to this OTDFG 1. The OTDFG 1 generates, as an output, target driving force (or torque) Td. The OTDFG 1 may include a memory storing a predetermined map, namely, a Td vs. (APO, VSP) map. The Td vs. (APO, VSP) map defines various values of Td against various combinations of values of APO and values of VSP. After retrieving this map, the OTDFG 1 determines Td against APO and VSP. The reference numeral 2 designates a driving torque generator (DTG). The DTG 2 processes input information to determine and generate driving torque TRQALL that is to be imparted to the drive axles. The reference numeral 3 designates a standard resistance generator (SRG). VSP is used as an input to the SRG 3. The SRG 3 determines and generates, as an output, a value of standard resistance RLDTRQ against a given reading point of VSP. The SRG 3 may include a memory storing a measured value of RLDTRQ at each of a predetermined number of reading points of VSP. The SRG 3 uses linear interpolation in determining a value of RLDTRQ at a reading point of VSP falling between the adjacent two of the predetermined reading points of VSP. The reference numeral 4 designates a corrected target driving force generator (cTDFG). RLDTRQ and TRQALL are used as inputs to the cTDFG 4. In the cTDFG 4, RLDTRQ is subtracted from TRQALL to give a gradient resistance torque RESTRQ. RESTRQ is used to generate driving force correction ADDFD. Td is also used as an input to the cTDFG 4. Td and ADDFD are added to give corrected target driving force cTd. ADDFD represents an increase in target driving force against an increase in road gradient. The CTDFG 4 generates a driving force command indicative of the corrected target driving force cTd. The reference numeral 5 designates a target driving force realizing command generator (TDFRCG). The driving force command is used as an input to the TDFRCG 5. In addition to the driving ratio command indicative of cTd, the parameters VSP, RATIO, tTIRE, and zRATIO are used as inputs to the TDFRCG 5, where, tTIRE is the tire radius and zRATIO is the final reduction ratio. Based on these inputs, the TDFRCG 5 determines target engine torque tTe to be produced by the engine 101 and target input shaft speed tNin to be accomplished by the automatic transmission 103.

The DTG 2 includes an ideal driving torque generator (IDTG) 22. The IDTG 22 includes an engine torque generator (ETG) 21. Tp and NRPM are fed, as inputs, to the ETG 21. The ETG 21 determines engine torque Te in response to Tp and NRPM and generates the determined engine torque Te. The ETG 21 may include a memory storing a predetermined map, namely a Te vs. (Tp, NRPM) map. The Te vs. (Tp, NRPM) map defines various values of engine torque Te against varying combinations of values of Tp and values of NRPM. A torque ratio τRATIO of the torque converter and a speed ratio RATIO of the automatic transmission 103 are also used as inputs to the IDTG 22. In the IDTG 22, a product of Te and τRATIO is calculated, and the result (TexτRATIO) is multiplied with RATIO to give ideal driving torque idTRQ (idTRQ=TexτRATIOxRATIO). The IDTG 22 generates as an output the ideal driving torque idTRQ. In the DTG 2, acceleration resistance torque GTRQ is subtracted from idTRQ to give TRQALL (TRQALL= idTRQ−GTRQ).

The acceleration resistance torque GTRQ is given by multiplying a predetermined vehicle weight equivalent coefficient KCONST with vehicle longitudinal acceleration GDATA. GDATA is given by calculating the time derivative of VSP. The torque ratio τRATIO is given as a ratio of engine speed NRPM and input shaft speed Nin, i.e., τRATIO= NRPM/Nin.

Inputs to the cTDFG 4 are TRQALL from the DTG 2 and RLDTRQ from the SRG 3. The cTDFG 4 subtracts RLDTRQ from TRQALL to give RESTRQ, which is used as an input to a driving force correction generator (DFCG) 41 of the cTDFG 4. The DFCG 41 determines ADDFD in response to RESTRQ. The DFCG 41 may include a memory storing a predetermined map, namely, an ADDFD vs. RESTRQ map (see FIG. 2). The ADDFD vs. RESTRQ map defines various values of ADDFD against various values of RESTRQ. The DFCG 41 may retrieve the ADDFD vs. RESTRQ map to determine ADDFD. Td is used an input to a driving force correction point in the form of a summation point 42 of the cTDFG 4. At the summation point 42, ADDFD is added to Td to give cTd that is generated as the driving force command.

With regard to the DFCG 41, the ADDFD vs. RESTRQ map clearly shows that ADDFD remains zero when RESTRQ falls in an insensible range from zero to a predetermined value. The insensible range is set to avoid unnecessary correction of the driving force Td due to arithmetic error in determining RESTRQ.

The driving force command indicative of cTd is used as an input to TDFRCG 5. Also fed to the TDFRCG 5 as inputs are VSP, RATIO, rTIRE, and zRATIO. The TDFRCG 5 divides cTd by RATIO and the result is multiplied with (rTIRE/zRATIO) to give a target engine torque tTe, and determines a target input shaft speed tNin in response to VSP and cTd. The TDFRCG 5 may include a memory storing a predetermined map, namely, a tNin vs. (cTd, VSP) map. The TDFRCG 5 retrieves the tnin vs. (cTd, VSP) map to determine tnin. The TDFRCG 5 generates engine torque command indicative of tTe and ratio command indicative of tNin.

The TDFRCG 5 feeds the engine torque command tTe to the engine controller of the engine 101 and the ratio command tNin to the transmission controller of the automatic transmission 103. In order to adjust engine torque of the engine 101 toward tTe, the engine controller adjusts fuel injection quantity Tp and/or intake airflow rate Qa. The transmission controller adjusts the speed ratio within the automatic transmission 103 to adjust the current input shaft speed toward tNin.

As the discussion proceeds, it will be understood that a value of RESTRQ will stay in the neighborhood of zero level during the motion of an automotive vehicle that is driven to keep rolling over the surface of a flat road having 0% gradient Thus, the target driving force Td is not corrected.

Figure 3:
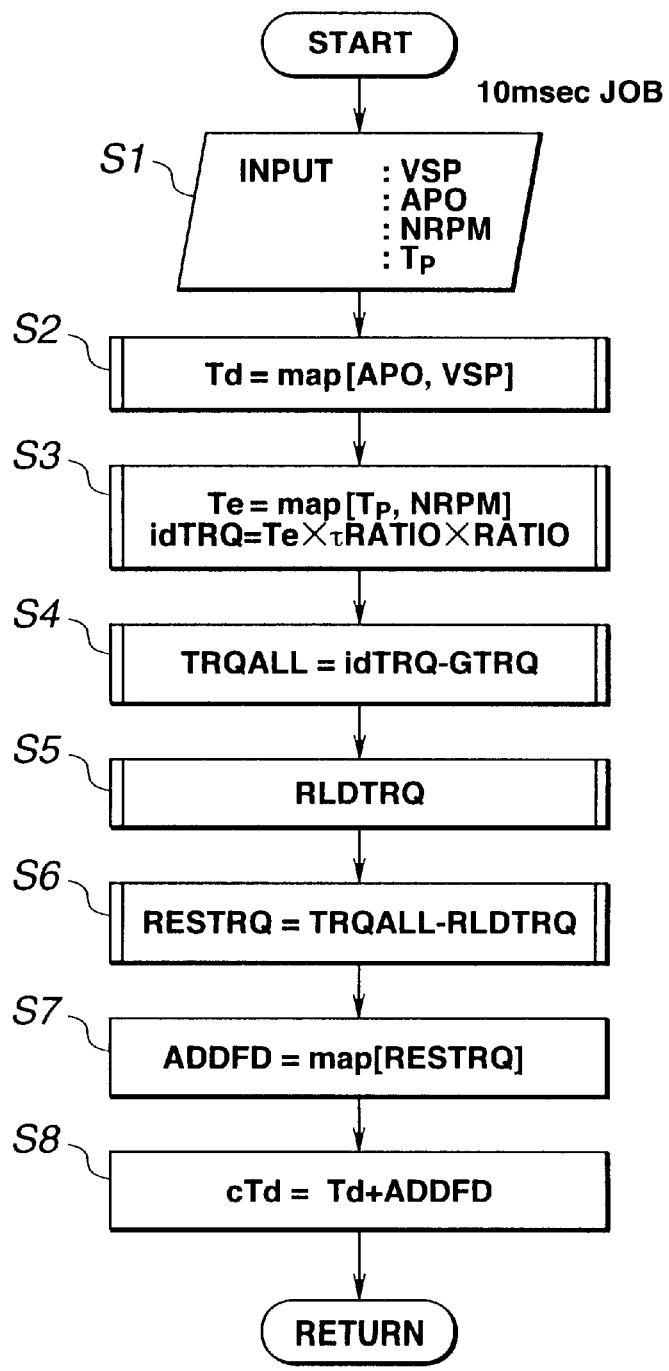
FIG. 3 is a flow chart of a control routine implementing the present invention.

FIG. 3 is a very simplified flow chart of a control routine implementing the present invention. This control routine is executed at regular intervals of 10 milliseconds. At step S1, a central processing unit (CPU) of the PCM 50 (see FIG. 1) inputs information of VSP, APO, NRP, and Tp, which are regarded as parameters expressing current operating conditions of the vehicle.

At step S2, which corresponds to OTDFG 1, the CPU determines Td by performing a table look-up operation of the Td vs. (APO, VSP) map (see FIG. 2 within the OTDFG 1) using APO and VSP.

At step S3, which corresponds to the DTG 2, in particular the IDTG 22, the CPU determines idTRQ. In determining idTRQ, the CPU determines Te after performing a table look-up operation of the Te vs. (Tp, NRPM) map (see FIG. 2 within the ETG 21) using Tp and NRPM. Then, the CPU calculates a product of Te, τRATIO, and RATIO to give the result as idTRQ.

At step S4, which corresponds to the IDTG 22, the CPU subtracts GTRQ from idTRQ to give the result as TRQALL.

At step S5, which corresponds to the SRG 3, the CPU determines a value of RLDTRQ against a current reading point of VSP by linear interpolation based on known values of RLDTRQ at a predetermined number of reading points of VSP. A known value of RLDTRQ against a reading point of VSP is a value of driving torque needed to keep an automotive vehicle rolling over the surface of a flat road having 0% gradient at the reading point of VSP. In the manner as later described more in detail, various values of RLDTRQ are set in a map or any other suitable array against various reading points of VSP. In determining RLDRQ, the CPU refers to the map or the array.

At step S6, which corresponds to a summation point 40 of the cTDFG 4, the CPU subtracts RLDTRQ from TRQALL to give RESTRQ.

At step S7, which corresponds to the DFCG 41 of the cTDFG 4, the CPU determines ADDFD based on RESTRQ. In determining ADDFD, the CPU may perform a table look-up operation of an ADDFD vs. RESTRQ map (see FIG. 2 within-the DFCG 41) using RESTRQ.

At step S8, which corresponds to the summation point 42 of the cTDFG 4, the CPU determines ctTd by calculating a sum of Td and ADDFD. In order to realize driving torque corresponding to the ctTd, the engine 101 and automatic transmission 103 are controlled in the same manner as explained in connection with FIG. 2.

[Determination of Standard Resistance Value]

Now, the manner of determining a value of standard resistance RLDTRQ against any given reading point of vehicle speed VSP is explained in detail.

Figure 4:
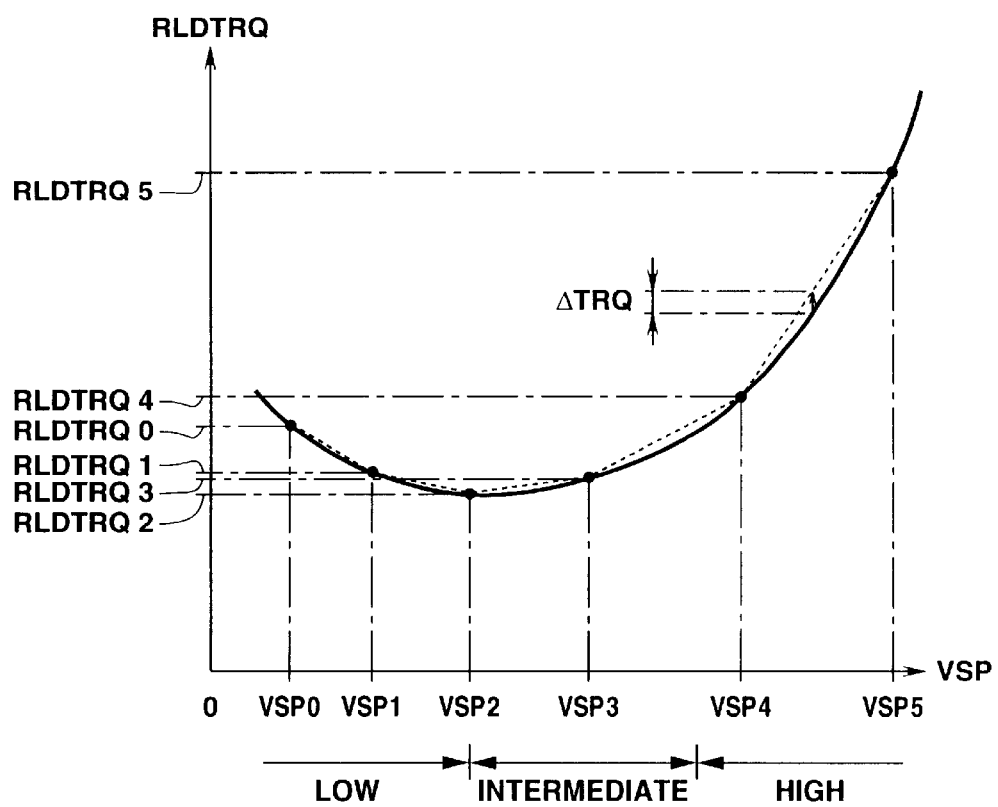
FIG. 4 is a graphical representation of a characteristic of variation of standard running resistance (RLDTRQ) against variation of vehicle speed (VSP) over low, intermediate and high ranges of vehicle speed.

Referring to FIG. 4, the fully drawn characteristic curve illustrates actual variation of standard resistance against variation of vehicle speed VSP. Values lying on this fully drawn characteristic curve have been actually measured at a predetermined number of reading points VSP0 to VSP5 and are plotted in FIG. 4. Measurement is made of a value of driving torque TRQALL, which is needed to keep an automotive vehicle rolling over the surface of a flat road having 0% gradient at each of the predetermined reading points of VSP. The measured values of TRQALL are used as the known values of RLDTRQ at the predetermined reading points of VSP, respectively. These values of RLDTRQ, namely, RLDTRQ0, RLDTRQ1, RLDTRQ2, RLDTRQ3, RLDTRQ4, and RLDTRQ5. Are stored in a map or an array.

Using the stored known values of RLDTRQ, the SRG 3 (see FIG. 2) or the step S5 (see FIG. 3) determines a value of RLDTRQ at a current reading point of VSP by linear interpolation. In FIG. 4, broken straight lines, each interconnecting the adjacent two of the known values RLDTRQ0 to RLDTRQ5, illustrate variation of values of RLDTRQ determined at the SRG 3 or the step S5.

In FIG. 4, each of values lying on the fully drawn curve accurately represents standard resistance against the motion of an automotive vehicle when the engine 101 drives the vehicle to keep it rolling over the surface of a flat road at a given reading point of vehicle speed. Each value on this fully drawn curve contains resistance due to friction within the automatic transmission 103 and pump loss. This explains why the fully drawn curve is concave over various reading points of vehicle speed including VSP0 to VSP5.

In FIG. 4, the six reading points of vehicle speed VSP0 to VSP5 are selected from and represent low, intermediate, and high vehicle speed ranges. In accordance with an increase in vehicle speed VSP from VSP0, for example, 10 km/h, of low vehicle speed range to VSP2, for example, 40 km/h, of intermediate vehicle speed range, there is a gradual decrease in resistance. From intermediate vehicle speed range to VSP5, for example a vehicle speed above 100 km/h, of high vehicle speed range, there is an increase in resistance in accordance with an increase in vehicle speed VSP. Values in resistance over high vehicle speed range are greater than values in resistance over low vehicle speed range. Thus, the fully drawn curve approximated by the determined values of RLDTRQ is concave as different from an inclined curve toward high vehicle speed side as obtained by the before mentioned coast down technique.

At every reading point vehicle speed, a value of RLDTRQ, which has been determined by linear interpolation using two of RLDTRQ0 to RLDTRQ5 is always greater than or equal to a value of standard resistance on the fully drawn line shown in FIG. 4.

The value of RLDTRQ generated by the SRG 3 (see FIG. 2) or at step S5 (see FIG. 3) is always greater than or equal to the actual value of standard resistance, thus preventing excessive increment of driving force.

The number of reading points of VSP at which values of RLDTRQ are measured determines a deviation of a value of RLDTRQ given by linear interpolation at a given reading point of VSP from an actual value of standard resistance at the same given reading point of VSP. If the number of reading points of VSP at which values of RLDTRQ are measured were too small, a value of RLDTRQ given by linear interpolation might deviate considerably, in the positive direction, from an actual value of standard resistance. This might cause an error in detection of road gradient. Increasing the number of reading points of VSP at which values of RLDTRQ are measured will reduce the deviation of the values given by linear interpolation from the actual value of standard resistance. However, this will require a memory, such as a read only memory (ROM), with an increased storage capacity. Besides, an increase in time and work for measuring values of RLDTRQ will cause an increase in manufacturing cost.

Figure 6:
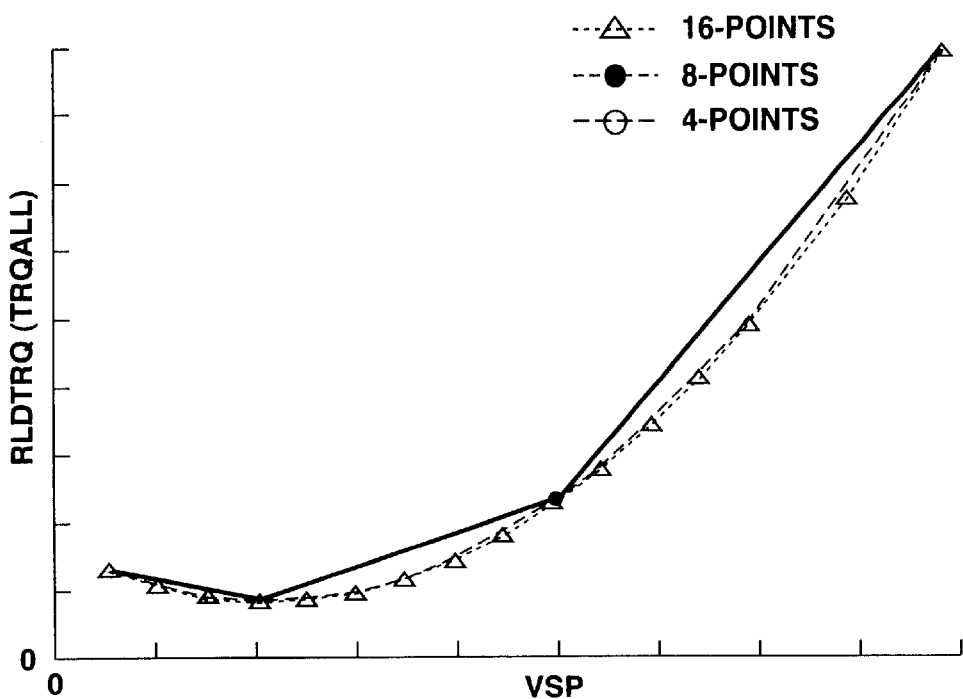
FIG. 6 illustrates linear interpolation using a first set of values of standard running resistance (RLDTRQ) determined at 16 reading points vehicle speed (VSP), a second set of values of standard running resistance (RLDTRQ) determined at 8 reading points of vehicle speed (VSP), and a third set of values of standard running resistance (RLDTRQ) determined at 4 reading points of vehicle speed (VSP).

FIG. 6 illustrate the results of linear interpolation and the number of measured values of RLDTRQ used for the linear interpolation.

Within the same range of vehicle speed, the results of linear interpolation using measured values of RLDTRQ at four (4), eight (8), and sixteen (16) reading points of VSP have been considered. Results of interpolation using the measured values at 16 reading points of VSP agree substantially with the actual values of standard resistance.

Results of linear interpolation using measured values of RLDTRQ at 4 reading points of VSP deviate in the positive direction from the actual values of standard resistance beyond an acceptable limit. In this case, the deviation amounts to as much as about 2% in terms of road gradient. Use of these values as RLDTRQ might cause undesired correction of driving force.

Results of linearinterpolation using measured values at 8 reading points of VSP slightly deviate in the positive direction from the actual values of standard resistance within an acceptable limit. In this case, the deviation amounts to as much as about 0.5% in terms of road gradient.

Further study of the results of linear interpolation over measured values at other numbers of reading points of VSP has revealed that 6 reading points of VSP is the least among different numbers of reading points of VSP, which have been selected as providing the deviations within an acceptable limit. If accuracy is emphasized, use of measured values at 8 reading points of VSP is preferred for linear interpolation. The acceptable limit is set such that, within this acceptable limit, the deviations of the results of linear interpolation from the actual values of standard resistance will not cause RESTRQ from exceeding the insensitive range set in the ADDFD vs. RESTRQ map in the DFCG 41 (see FIG. 2).

Measured values at a number of reading points of VSP greater than 6 may surely be used for preparing a map or an array if the capacity of memory permits and manufacturing cost increase falls in an acceptable range.

From the preceding description, it will be appreciated that the number of reading points of VSP should not be less than 6 and preferably it should be 8. Within this range, the deviations of the results of interpolation can be confined within the acceptable limit. Thus, with driving force control kept at sufficiently high accurate level, the storage capacity of a memory for storing the data and the number of steps in setting the data are suppressed and an increase in manufacturing cost is suppressed.

[Measurement of Standard Resistance]

Measurement and the subsequent setting of values of RLDTRQ against the selected reading points of are explained.

Measurement of a value of RLDTRQ is initiated by driving an automotive vehicle with the D range to keep it rolling over the surface of a flat road having 0% gradient The DTG 2 of the PCM 50 shown in FIG. 2 is put into operation. At each of predetermined reading points of VSP, a driving torque value of TRQALL that is generated by the DTG 2 is stored. The stored values of TRQALL are used as measured values RLDTRQ.

The cTDFG 4 is rendered inoperable, leaving the Td uncorrected and allowing the uncorrected Td to be used as an input to the TDFRCG 5.

Figure 5:
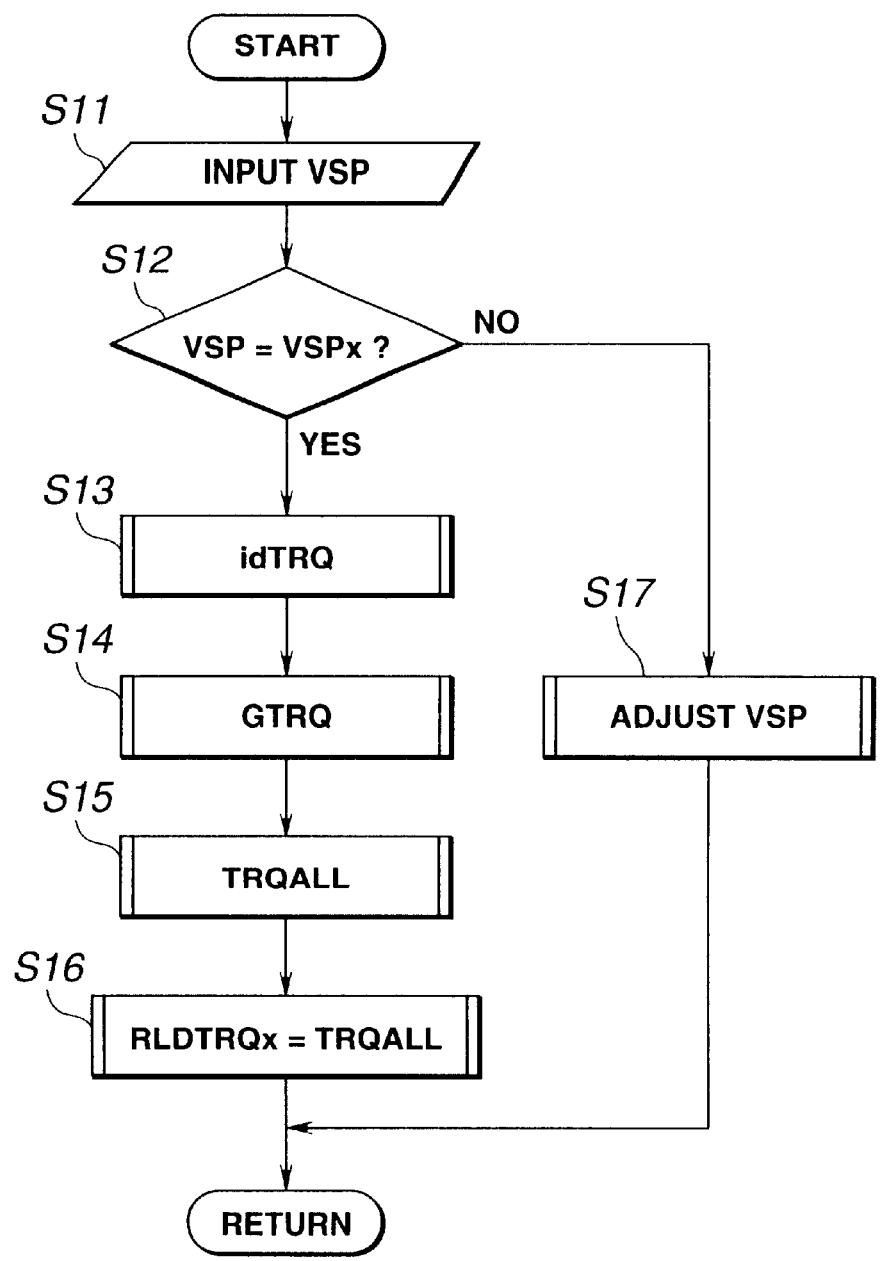
FIG. 5 is a flow chart of a control routine determining a value of standard running resistance at a given reading point of vehicle speed.

FIG. 5 is a flow chart illustrating steps of processing to measure and set values of RLDTRQ. Explaining in detail along this flow chart, the current VSP is recognized by perception of the vehicle operator (at step S11). Upon accomplishment of steady state immediately after one VSPx of the predetermined points of vehicle speed VSP has been reached, a current value of idTRQ determined by the IDTG 22 of the DTG 2 is stored (at steps S12 & S13). Then, a current value of GTRQ determined in the DTG 2 is stored (at step S14). Next, a current value of TRQALL is determined by subtracting the stored value of GTRQ from the stored value of idTRQ (at step S15). Finally, the determined value of TRQALL is set as a measured value of standard resistance RLDTRQx at the point VSPx of VSP.

If the current VSP fails to reach VSPx (at step S12), the vehicle operator adjusts the APO of the accelerator to accomplish a shift to steady running state at VSPx (at step S17).

Execution of the steps S12 to S16 is initiated upon accomplishment of steady running state at VSPx. If 6 reading points of VSP, namely, VSP0, VSP1, VSP2, VSP3, VSP4, VSP5, and VSP6, are selected, six measured values of TRQALL are set as RLDTRQX (x=0, 1, 2, 3, 4, 5, 6) against the six different reading points VSPx (x=0, 1, 2, 3, 4, 5, 6). In this manner, the six measured values RLDTRQ0 to RLDTRQ5 are set against six points VSP0 to VSP5 in a map or array within the SRG 3 (see FIG. 2).

All components of the PCM 50 are enabled after the measured values RLDTRQ0 to RLDTRQ5 have been set. Thereafter, the PCM 50 is enabled to determine RESTRQ at sufficiently high accurate level, thus contributing to enhancement of accurate level at which the driving force control is carried out.

The PCT50 no longer regards an increase in driving torque against friction within the automatic transmission 103 and pump loss as an increase in road gradient torque, realizing a driving force control free from any excessive amount of correction more than anticipated by the operator. This is because values of TRQALL are measured at predetermined points VSP0 to VSPS during the steady running state when the engine drives the automotive vehicle to keep it rolling over the surface of a flat road, and the measured values are set as values of standard resistance RLDTRQ0 to RLDTRQS, respectively. These measured values RLDTRQ0 to RLDTRQ5 are used for linear interpolation in determining a value RLDTRQx at a reading point VSPx.

During steady running state when the engine drive an automotive vehicle to keep it rolling at constant vehicle speed over the surface of a flat road having 0% gradient, the deviation ΔTRQ (see FIG. 4) becomes the minimum. Under this condition, a current value of TRQALL lies on the fully drawn curve in FIG. 4, and a current value of RLDTRQ lies on the dotted straight line in FIG. 4. The illustrated relationship, in FIG. 4, between values of TRQALL on the fully drawn curve and values of RLDTRQ on the broken straight lines ensures enhanced accurate level of correction of driving force control Referring to FIGS. 2 and 4, let us examine the case when the engine drives the vehicle to keep it rolling over the surface of a flat road having 0% gradient at constant vehicle speed. In this case, a value of RLDTRQ, which results from linear interpolation, is always greater than a value of TRQALL generated by the DTG 2. Subtraction of RLDTRQ from TRQALL conducted at the summation point gives RESTRQ a negative value, causing the DFCG 41 to give ADDFD zero. This prevents the PCM 50 from regarding an increase in driving torque to oppose friction in the automatic transmission 103 as a gradient resistance torque. This results in providing a driving force control system free from an excessive amount of correction of driving force more than expected by the vehicle operator.

In the preceding description, the SRG 3 has used data stored in the ROM in a map or in an array. If preferred, the SRG 3 may use a function in determining RLDTRQ. More specifically, the SRG 3 may determine RLDTRQ as a function of VSP.

Figure 7:
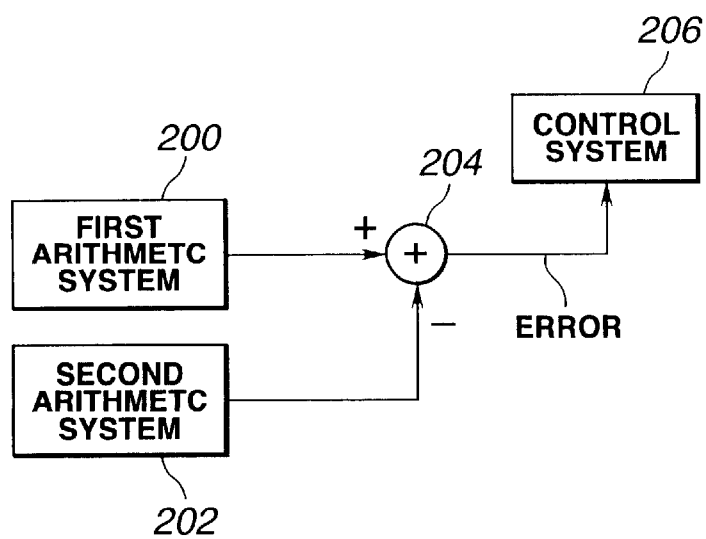
FIG. 7 is a generalized control diagram implementing the present invention.

FIG. 7 illustrates a vehicle control system implementing the present invention. In FIG. 7, the vehicle control system comprises a first arithmetic system 200 that inputs a plurality of operating parameters of the vehicle power train and outputs a first signal only. A second arithmetic system 202 inputs a parameter indicative of state in which an automotive vehicle runs and outputs a second signal only. At a summation point 204, the second signal is subtracted from the first signal to give an error. A control system 206 inputs this error and outputs a command on the power train in such a manner as to decrease the error toward zero. At each of a predetermined number of reading points of the state indicative parameter, a value of the second signal is determined when the error is kept at the minimum. The determined values of the second signal are set against predetermined reading points of the state indicative parameter, respectively. The second arithmetic system 202 uses these data in determining a value of the second signal against a reading point of the state indicative parameter.

The vehicle control system shown in FIG. 7 is a generalized expression of the vehicle control system shown in FIG. 2. The first arithmetic system includes the DTG 2.

Thus, the inputs to the first arithmetic system 200 include NRPM, Tp, τRATIO, RATIO, and GDATA. The first signal from the first arithmetic system 200 is TRQALL. The second arithmetic system 202 includes SRG 3. The state indicative parameter fed to the second arithmetic system 202 is VSP. The second signal from the second arithmetic system 202 is RLDTRQ. At the summation point 204, the error is given by subtracting RLDTRQ from TRQALL. The control system 206 includes OTDFG 1 and cTDFG 4. The error is used as input to the control system 206. The command generated by the second control system 206 is driving force command cTd.

Figure 8:
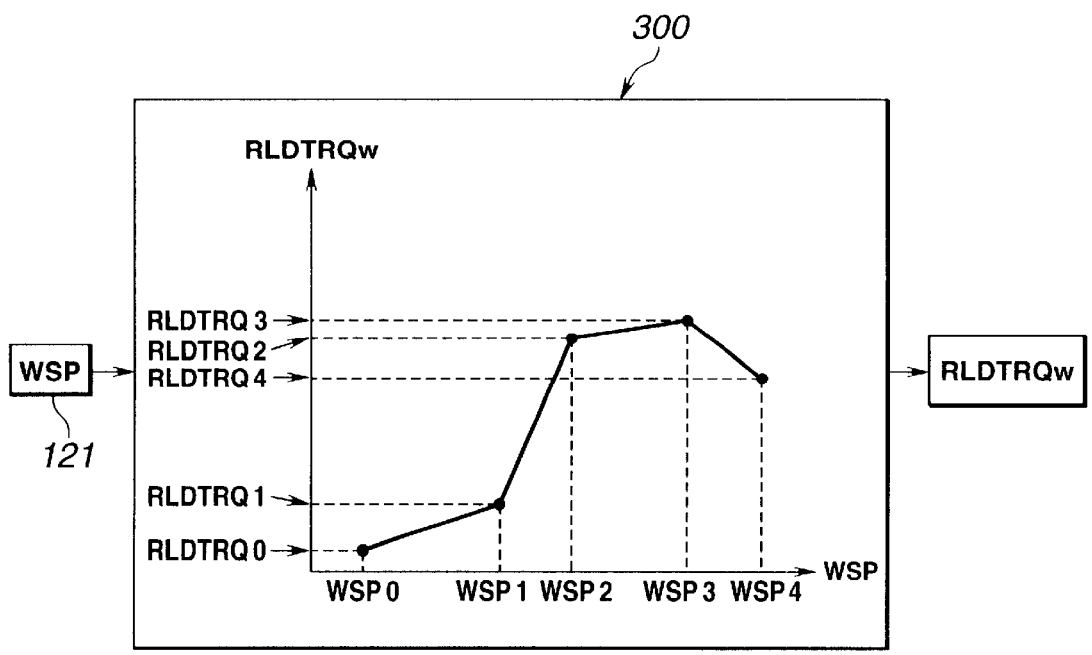
FIG. 8 illustrates a characteristic of variation of values of standard running resistance (RLDTRQw) against variation of reading points of wind speed (WSP) of wind against which the automotive vehicle is driven to run on a flat road having 0% gradient.

FIG. 8 is a block diagram illustrating another form of SRG that is now denoted by the reference numeral 300. The SRG 300 inputs information as to wind speed WSP, along the longitudinal direction of a vehicle from an anemometer 121 and outputs a wind speed dependent standard resistance RLDTRQw. Using RLDTRQw, variation of WSP can give variation in amount of correction of driving force.

The SRG 300 stores in a memory, such as ROM, a set of values of RLDTRQw measured at a set of values of wind speed WSP during steady state run of the vehicle on a flat road at a predetermined value of vehicle speed VSP.

In the illustrated example in FIG. 8, five values WSP0, WSP1, WSP2, WSP3, and WSP4 are selected as points at which is values of resistance RLDTRQ0, RLDTRQ1, RLDTRQ2, RLDTRQ3, and RLDTRQ4 are measured. FIG. 8 clearly shows that RLDTRQw starts decreasing when the value of wind speed VSP3 is exceeded. This decrease is caused by turbulence resulting from a separation of boundary layer about the vehicle body at very high vehicle speeds inducing values of wind speed beyond VSP3.

The SRG 300 may replace the SRG 3. In this case, RLDTRQw is set as RLDTRQ in the signal processing shown in FIG. 2. Variation in standard resistance occurring due to aerodynamic loss owing to variation in configuration of the vehicle body can be corrected using RLDTRQw.

Figure 9:
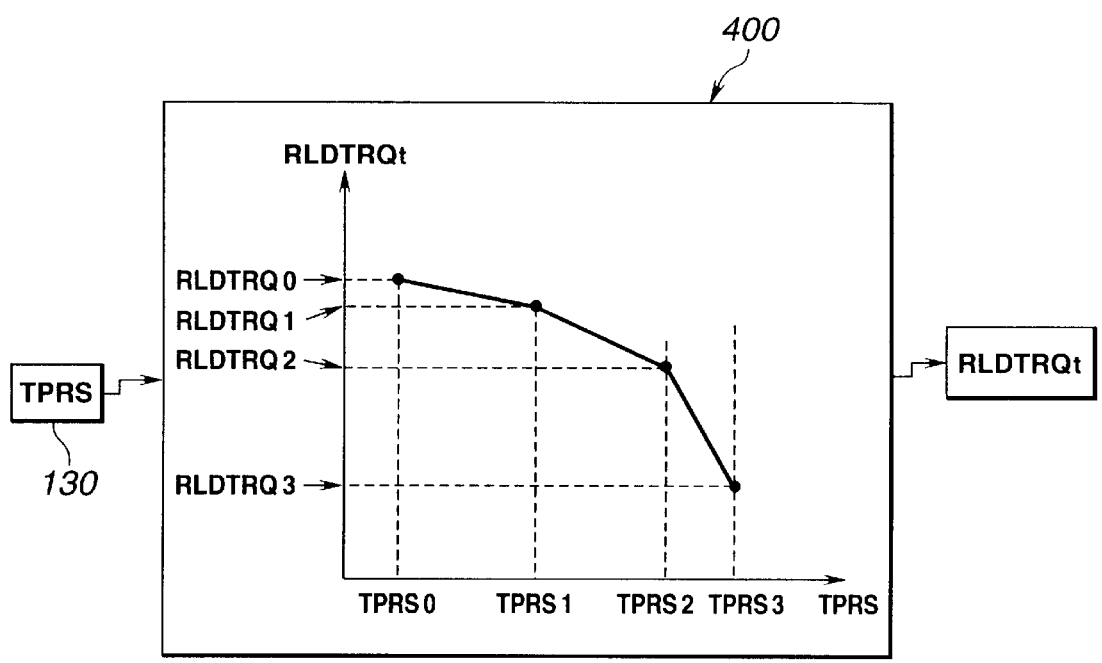
FIG. 9 illustrates a characteristic of variation of values of standard running resistance (RLDTRQt) against variation of reading points of tire air pressure (TRPS) of the automotive vehicle.

FIG. 9 is a block diagram illustrating still another form of SRG that is now denoted by the reference numeral 400. The SRG 400 inputs information as to tire pressure TPRS from a tire pressure sensor 130 and outputs a tire pressure dependent standard resistance RLDTRQt. Using RLDTRQt, variation of TPRS can give variation in amount of correction of driving force.

The SRG 400 stores in a memory, such as ROM, a set of values of RLDTRQt measured at a set of values of tire pressure TPRS during steady running state of the vehicle on a flat road at a predetermined value of vehicle speed VSP.

In the illustrated example in FIG. 9, four values TPRS0, TPRS1, TPRS2, and TPRS3 are selected as points at which values of resistance RLDTRQ0, RLDTRQ1, RLDTRQ2, and RLDTRQ3, are measured.

The SRG 400 may replace the SRG 3. In this case, RLDTRQt is set as RLDTRQ in the signal processing shown in FIG. 2. RLDTRQt correctly reflects variation in rolling resistance due to variation in tire pressure, making it possible to correct driving force in accordance with an increase in resistance due to a drop in tire pressure.

Figure 10:
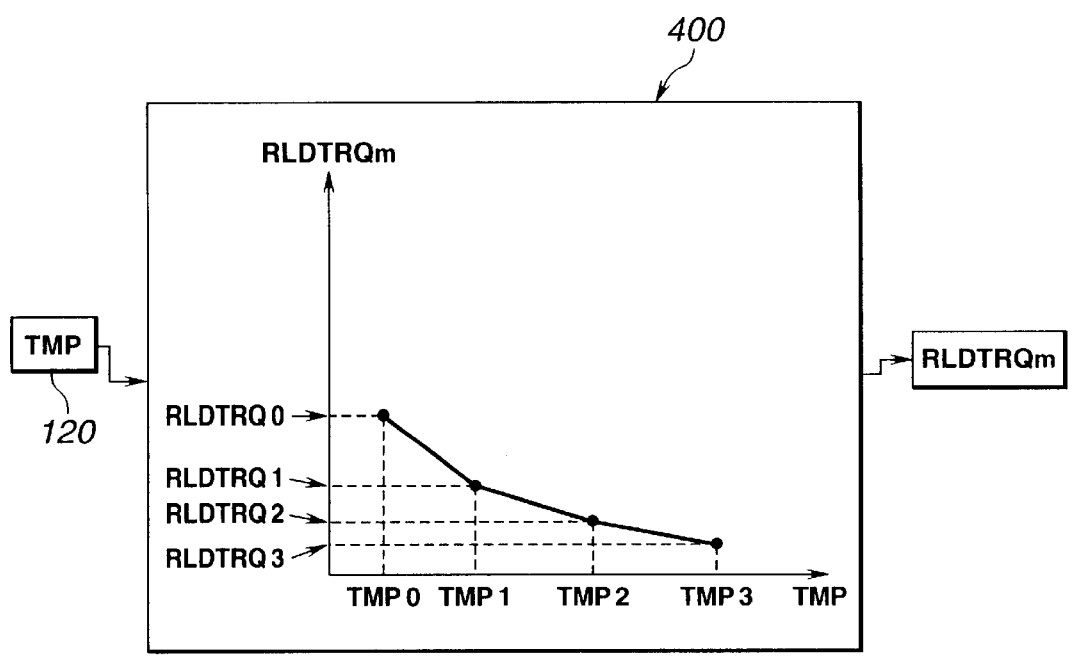
FIG. 10 illustrates a characteristic of variation of values of standard running resistance (RLDTRQm) against variation of reading points of external temperature (TMP) around the automotive vehicle.

FIG. 10 is a block diagram illustrating further form of SRG that is now denoted by the reference numeral 500. The SRG 500 inputs information as to outside air temperature TMP from an outside air temperature sensor 120 (see FIG. 1) and outputs an outside air temperature dependent standard resistance RLDTRQm. Using RLDTRQm, variation of can give variation in amount of correction of driving force. For example, an increase in outside air temperature TMP causes a drop in air density, causing a drop in loading efficiency of the engine 101, resulting in a drop in engine torque Te. This drop in engine torque Te is expressed in terms of outside air temperature dependent resistance RLDTRQm.

The SRG 500 stores in a memory, such as ROM, a set of values of RLDTRQ measured at a set of values of outside air temperature TMP during steady state run of the vehicle on a flat road at a predetermined value of vehicle speed VSP.

In the illustrated example in FIG. 10, four values TMP0, TMP1, TMP2, and TMP3 are selected as points at which values of resistance RLDTRQ0, RLDTRQ1, RLDTRQ2, and RLDTRQ3, are measured.

The SRG 500 may replace the SRG 3. In this case, RLDTRQm is set as RLDTRQ in the signal processing shown in FIG. 2. RLDTRQm correctly reflects variation in engine torque, making it possible to correct driving force in accordance with the variation in engine torque.

In the preceding description, RLDTRQ, RLDTRQw, RLDTRQt, and RLDTRQm are used in an independent manner. Preferably, they are combined to provide a standard resistance, making it possible to increase accurate level at which resistance on the vehicle is determined. This enhances accurate level of driving force control.

In the preceding description, the vehicle is driven to run on a flat road with 0% gradient for measurement and setting of RLDTRQ. The vehicle may be driven to run on a chassis dynamometer for measurement and setting of RLDTRQ.

In the preceding description, a set of values of vehicle speed VSP is selected to measure a set of values of standard resistance RLDTRQ. If a function can express a standard resistance indicative curve, a value of standard resistance is measured at one value of vehicle speed VSP and the measured value of RLDTRQ is used to shift the function.

While the present invention has been particularly described, in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-58291, filed Mar. 5, 1999 is hereby incorporated by reference in its entirety.

What is claimed is:

1. A process of forming a value of standard resistance for an automotive vehicle, the automotive vehicle having driving wheels, each having a tire, and a power train including an engine, the process comprising:

operating the engine to keep the automotive vehicle rolling over the surface of a flat road having 0% gradient in steady running state at each of a predetermined number of reading points of vehicle speed;

sensing operating parameters indicative of operating conditions of the power train during operating the engine to keep the automotive vehicle rolling over the surface of the flat road in steady running state at each of said predetermined number of reading points of vehicle speed;

deriving a value of driving torque produced by the power train from said sensed operating parameters at each of said predetermined number of reading points of vehicle speed;

setting said derived values of driving torque as known standard resistance values at said predetermined number of reading points of vehicle speed, respectively; and conducting linear interpolation, in determining a value of standard resistance at a reading point of vehicle speed in the domain between the adjacent two of said plurality of reading points of vehicle speed, between said known standard resistance values at the adjacent two reading points of vehicle speed.

2. The process as claimed in claim 1, wherein said predetermined number of reading points of vehicle speed is six.

3. A process of forming a value of standard resistance for an automotive vehicle, the automotive vehicle having driving wheels, each having a tire, and a power train including an engine, the process comprising:

sensing speed of wind flowing against the automotive vehicle;

operating the engine to keep the automotive vehicle rolling over the surface of a flat road having 0% gradient in steady running state at a given vehicle speed against wind at each of a predetermined number of reading points of wind speed;

sensing operating parameters indicative of operating conditions of the power train during operating the engine to keep the automotive vehicle rolling over the surface of the flat road in steady running state at said given vehicle speed against wind at each of said predetermined number of reading points of wind speed;

deriving a value of driving torque produced by the power train from said sensed operating parameters at each of said predetermined number of reading points of wind speed; and setting said derived values of driving torque as known standard resistance values at said predetermined number of reading points of wind speed, respectively.

4. A process of forming a value of standard resistance for an automotive vehicle, the automotive vehicle having driving wheels, each having a tire, and a power train including an engine, the process comprising:

determining air pressure of the tires of the driving wheels;

operating the engine to keep the automotive vehicle rolling over the surface of a flat road having 0% gradient in steady running state at a given vehicle speed at each of a predetermined number of reading points of tire air pressure;

sensing operating parameters indicative of operating conditions of the power train during operating the engine to keep the automotive vehicle rolling over the surface of the flat road in steady running state at said given vehicle speed at each of said predetermined number of reading points of tire air pressure;

deriving a value of driving torque produced by the power train from said sensed operating parameters at each of said predetermined number of reading points of tire air pressure;

setting said derived values of driving torque as known standard resistance values at said predetermined number of reading points of tire air pressure, respectively; and conducting linear interpolation, in determining a standard resistance value at a reading point of air pressure of the tires in the domain between the adjacent two of said plurality of reading points of tire air pressure, between said known value of standard resistance at the adjacent two reading points of tire air pressure.

5. A process of forming a value of standard resistance for an automotive vehicle, the automotive vehicle having driving wheels, each having a tire, and a power train including an engine, the process comprising:

determining external temperature around the automotive vehicle;

operating the engine to keep the automotive vehicle rolling over the surface of a flat road having 0% gradient in steady running state at a given vehicle speed at each of a predetermined number of reading points of the external temperature;

sensing operating parameters indicative of operating conditions of the power train during operating the engine to keep the automotive vehicle rolling over the surface of the flat road in steady running state at said given vehicle speed at each of said predetermined number of reading points of the external temperature;

deriving a value of driving torque produced by the power train from said sensed operating parameters at each of said predetermined number of reading points of the external temperature; and setting said derived values of driving torque as known standard resistance values at said predetermined number of reading points of the external temperature, respectively.

6. A vehicle control system for an automotive vehicle having driving wheels, each having a tire, and a power train including an engine and an automatic transmission, comprising:

a first arithmetic system that inputs a plurality of operating parameters of the power train and outputs a first signal only;

a second arithmetic system that inputs a parameter indicative of state in which the automotive vehicle runs and outputs a second signal only; and a control system that outputs a command on the power train, said control system being operative to correct said command in response to an error between said first and second signals, wherein, said second arithmetic system measures at each of a predetermined number of reading points of said state indicative parameter, a value of said second signal during running condition of the automotive vehicle when said error is kept at the minimum;

wherein, said second arithmetic system conducts linear interpolation using said measured values of said second signal at said predetermined number of reading points of said state indicative parameter, respectively in determining a characteristic of variation of said second signal against variation of said state indicative signal.

7. A vehicle control system for an automotive vehicle having driving wheels, each having a tire, and a power train including an engine and an automatic transmission, said vehicle control system comprising:

a driving torque generator that determines a value of driving torque in response to a plurality of operating parameters of the power train;

a standard resistance generator that inputs a reading point of vehicle speed and outputs a value of standard resistance; and a control system that outputs a command on the power train, said control system being operative to correct said command in response to an error between said determined value of driving torque and said outputted value of standard resistance;

wherein said standard resistance generator includes data which is formed by operating the engine to keep the automotive vehicle rolling over the surface of a flat road having 0% gradient in steady running state at each of a predetermined number of reading points of vehicle speed;

measuring a value of driving torque determined by said driving torque generator at each of said predetermined number of reading points of vehicle speed; and setting said measured values of driving torque as known standard resistance values at said predetermined number of reading points of vehicle speed, respectively, wherein said standard resistance generator conducts linear interpolation, in determining a value of standard resistance at a reading point of vehicle speed in the domain between the adjacent two of said plurality of reading points of vehicle speed, between said known values of standard resistance at the adjacent two reading points of vehicle speed, said standard resistance generator outputting said determined value of standard resistance as said value of standard resistance.

8. The vehicle control system as claimed in claim 7, wherein said driving torque generator includes:

an engine torque generator that inputs the engine speed and the fuel injection quantity to determine output torque of the engine;

a ratio determining section that determines a speed ratio of the automatic transmission;

an ideal driving torque generator that determines driving torque based on said determined output torque of the engine and said determined speed ratio of the automatic transmission;

a vehicle acceleration determining section that determines acceleration at which the automotive vehicle runs;

an acceleration resistance determining section that determines acceleration resistance torque based on said determined acceleration;

wherein said driving torque generator subtracts said determined acceleration torque from said determined ideal driving torque to give a result as said driving torque.

9. The vehicle control system as claimed in claim 7, wherein said standard resistance generator has said known standard resistance values in a map and determines standard resistance values that decrease as reading points of vehicle speed increase from a low range of vehicle speed toward an intermediate range of vehicle speed and increase as reading points of vehicle speed further increase from the intermediate range of vehicle speed toward a high range of vehicle speed.

10. The vehicle control system as claimed in claim 9, wherein said predetermined number of reading points of vehicle speed is six.

11. The vehicle control system as claimed in claim 7, wherein said standard resistance generator has said known standard resistance values as variables of a function, and determines standard resistance values that decrease as reading points of vehicle speed increase from a low range of vehicle speed toward an intermediate range of vehicle speed and increase as reading points of vehicle speed further increase from the intermediate range of vehicle speed toward a high range of vehicle speed.

12. A vehicle having a control system for an automotive vehicle having driving wheels, each having a tire, and a power train including an engine and an automatic transmission, said vehicle control system comprising:

a driving torque generator that determines a value of driving torque in response to a plurality of operating parameters of the power train;

a standard resistance generator that inputs a reading point of wind speed of wind against which the automotive vehicle runs and outputs a value of standard resistance; and a control system that outputs a command on the power train, said control system being operative to correct said command in response to an error between said determined value of driving torque and said outputted value of standard resistance:

wherein said standard resistance generator includes data which is formed by sensing wind speed of wind flowing against the automotive vehicle;

operating the engine to keep the automotive vehicle rolling over the surface of a flat road having 0% gradient in steady running state at a given vehicle speed against wind at each of a predetermined number of reading points of wind speed;

measuring a value of driving torque determined by said driving torque generator at each of said predetermined number of reading points of wind speed; and setting said measured values of driving torque as known values of standard resistance at said predetermined number of reading points of wind speed, respectively, wherein said standard resistance generator relies on said known values of standard resistance in determining a value of standard resistance at a reading point of wind speed, said standard resistance generator outputting said determined value of standard resistance as said value of standard resistance.

13. A vehicle control system for an automotive vehicle having driving wheels, each having a tire, and a power train including an engine and an automatic transmission, said vehicle control system comprising:

a driving torque generator that determines a value of driving torque in response to a plurality of operating parameters of the power train;

a standard resistance generator that inputs a reading point of air pressure of the tires of the driving wheels and outputs a value of standard resistance; and a control system that outputs a command on the power train, said control system being operative to correct said command in response to an error between said determined value of driving torque and said outputted value of standard resistance;

wherein said standard reference generator includes data formed by:

determining air pressure of the tires of the driving wheels;

operating the engine to keep the automotive vehicle rolling over the surface of a flat road having 0% gradient in steady running state at a given vehicle speed at each of a predetermined number of reading points of tire air pressure;

measuring a value of driving torque determined by said driving torque generator at each of said predetermined number of reading points of tire air pressure; and setting said measured values of driving torque as known standard resistance values at said predetermined number of reading points of tire air pressure, respectively, wherein said standard resistance generator conducts linear interpolation, in determining a value of standard resistance at a reading point of the tire air pressure in the domain between the adjacent two of said plurality of reading points to tire air pressure, between said known values of standard resistance at the adjacent two reading points of tire air pressure, said standard resistance generator outputting said determined value of standard resistance as said value of standard resistance.

14. A vehicle control system for an automotive vehicle having driving wheels, each having a tire, and a power train including an engine and an automatic transmission, said vehicle control system comprising:

a driving torque generator that determines a value of driving torque in response to a plurality of operating parameters of the power train;

a standard resistance generator that inputs a reading point of external temperature around the automotive vehicle and outputs a value of standard resistance; and a control system that outputs a command on the power train, said control system being operative to correct said command in response to an error between said determined value of driving torque and said outputted value of standard resistance;

wherein said standard resistance generator includes data formed by:

determining external temperature around the automotive vehicle;

operating the engine to keep the automotive vehicle rolling over the surface of a flat road having 0% gradient in steady running state at a given vehicle speed at each of a predetermined number of reading points of external temperature;

measuring a value of driving torque determined by said driving torque generator at each of said predetermined number of reading points of external temperature; and setting said measured values of driving torque as known standard resistance values at said predetermined number of reading points of external temperature, respectively, wherein said standard resistance generator relies on said known standard resistance values in determining a value of standard resistance at a reading point of external temperature, said standard resistance generator outputting said determined value of standard resistance as said standard resistance values.

* * * * *